United States Patent
Bilhan et al.

(10) Patent No.: US 12,535,539 B2
(45) Date of Patent: Jan. 27, 2026

(54) FAULT DETECTION FRONT END ARCHITECTURE IN RESOLVER

(71) Applicant: TEXAS INSTRUMENTS INCORPORATED, Dallas, TX (US)

(72) Inventors: Haydar Bilhan, Dallas, TX (US); Abhijit Das, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 187 days.

(21) Appl. No.: 18/477,997

(22) Filed: Sep. 29, 2023

(65) Prior Publication Data

US 2025/0110186 A1    Apr. 3, 2025

(51) Int. Cl.
*G01R 31/52*     (2020.01)
*G01R 31/08*     (2020.01)
*H03M 1/12*      (2006.01)
*H03M 1/46*      (2006.01)

(52) U.S. Cl.
CPC ........... *G01R 31/52* (2020.01); *G01R 31/088* (2013.01); *H03M 1/125* (2013.01); *H03M 1/468* (2013.01)

(58) Field of Classification Search
USPC ........................................................ 324/537
See application file for complete search history.

(56) References Cited

U.S. PATENT DOCUMENTS

2020/0116531 A1*  4/2020  Shimada .................. G01D 5/16
2022/0042827 A1*  2/2022  Bruckhaus ............. G01D 5/204

FOREIGN PATENT DOCUMENTS

| JP | 2020139916 A | 9/2020 |
| KR | 20190084940 B1 | 7/2019 |
| WO | 2022124412 A1 | 6/2022 |

OTHER PUBLICATIONS

International Search report for PCT/US2023/086381, dated Jun. 18, 2024.
Machine translation for WO2022124412A1.
Machine translation for KR20190084940B1.
Machine translation for JP2020139916A.

* cited by examiner

*Primary Examiner* — Farhana A Hoque
(74) *Attorney, Agent, or Firm* — Michelle Murray; Frank D. Cimino

(57) ABSTRACT

In some examples, a method includes applying a bias voltage to a resolver system. The method also includes receiving a sensed signal, the sensed signal varying in value based on a position of a rotary element. The method also includes attenuating the sensed signal to form an attenuated signal. The method also includes performing fault detection on the attenuated signal to detect faults in the resolver system. The method also includes processing the attenuated signal to determine the position of the rotary element.

21 Claims, 4 Drawing Sheets

FAULT DETECTION FRONT END ARCHITECTURE IN RESOLVER

BACKGROUND

A resolver determines a position, and an example resolver sensor provides sine and cosine sensing signals indicative of a position of a rotary element, such as a rotor of a motor. The resolver provides the sensing signals to a processing circuit. Based on determined values of the sensing signals, the processing circuit may control the rotary element.

SUMMARY

In some examples, a method includes applying a bias voltage to a resolver system. The method also includes receiving a sensed signal, the sensed signal varying in value based on a position of a rotary element. The method also includes attenuating the sensed signal to form an attenuated signal. The method also includes performing fault detection on the attenuated signal to detect faults in the resolver system. The method also includes processing the attenuated signal to determine the position of the rotary element.

In some examples, an apparatus includes a measuring transformer coil having first and second terminals. The apparatus also includes a first resistor having first and second terminals, the first terminal of the first resistor coupled to a voltage supply terminal, and the second terminal of the first resistor coupled to the first terminal of the measuring transformer coil. The apparatus also includes a second resistor having first and second terminals, the first terminal of the first resistor coupled to the second terminal of the first resistor. The apparatus also includes a third resistor having first and second terminals, the first terminal of the third resistor coupled to the second terminal of the second resistor. The apparatus also includes a fourth resistor having first and second terminals, the first terminal of the fourth resistor coupled to the second terminal of the third resistor, and the second terminal of the fourth resistor coupled to the second terminal of the measuring transformer coil. The apparatus also includes a fifth resistor having first and second terminals, the first terminal of the fifth resistor coupled to the second terminal of the fourth resistor, and the second terminal of the fifth resistor coupled to a ground terminal. The apparatus also includes a measurement circuit having first and second inputs, the first input of the measurement circuit coupled to the second terminal of the second resistor, and the second input of the measurement circuit coupled to the first terminal of the fourth resistor.

In some examples, an apparatus includes a processing circuit. The processing circuit is configured to receive an attenuated differential signal having first and second components, and perform fault detection based on a value of the attenuated signal. In an example, the fault detection includes determining that a short to ground fault has occurred responsive to a common mode voltage of the attenuated differential signal equaling a ground voltage potential. The fault detection also includes determining that a short to supply fault has occurred responsive to the common mode voltage of the attenuated differential signal equaling a supply voltage. The fault detection also includes determining that an open fault has occurred responsive to a common mode voltage of the first component of the attenuated differential signal equaling the supply voltage and a common mode voltage of the second component of the attenuated differential signal equaling the ground voltage potential. The fault detection also includes determining that a short across a coil fault has occurred responsive to the first component of the attenuated differential signal equaling the second component of the attenuated differential signal.

DETAILED DESCRIPTION

As described above, a resolver may provide sine and cosine sensing signals indicative of a position of a rotary element, such as a rotor of a motor. The resolver provides the sensing signals to a processing circuit, such as a microcontroller. Based on determined values of the sensing signals, the processing circuit controls the rotary element. For example, based on determined values of the sensing signals, the processing circuit may modify a drive signal provided which causes the rotary element to rotate, thereby increasing or decreasing a speed of rotation of the rotary element. In some examples, a voltage of the sensing signals may be outside of a range of acceptable voltages for input signals to the processing circuit. In some circumstances, an amplifier may be implemented between the resolver and the processing circuit to decrease a voltage of the sensing signals. However, the amplifier may be prohibitively large for some application environments, increasing a cost of implementation and a size of a resolver system.

Examples of this description provide for a front end architecture for a resolver. The front end architecture may couple between the resolver and the processing circuit to attenuate the sensing signals provided by the resolver, prior to providing the attenuated signals to the processing circuit. In some examples, the front end architecture may perform the attenuation without implementing an amplifier. In some examples, a topology of the front end architecture further facilitates fault detection, enabling the processing circuit to determine various fault conditions of the resolver and/or the front end architecture. The fault conditions may include at least a short to ground, a short to supply, an open circuit at a sensing coil, or a short across the sensing coil.

Figure 1:
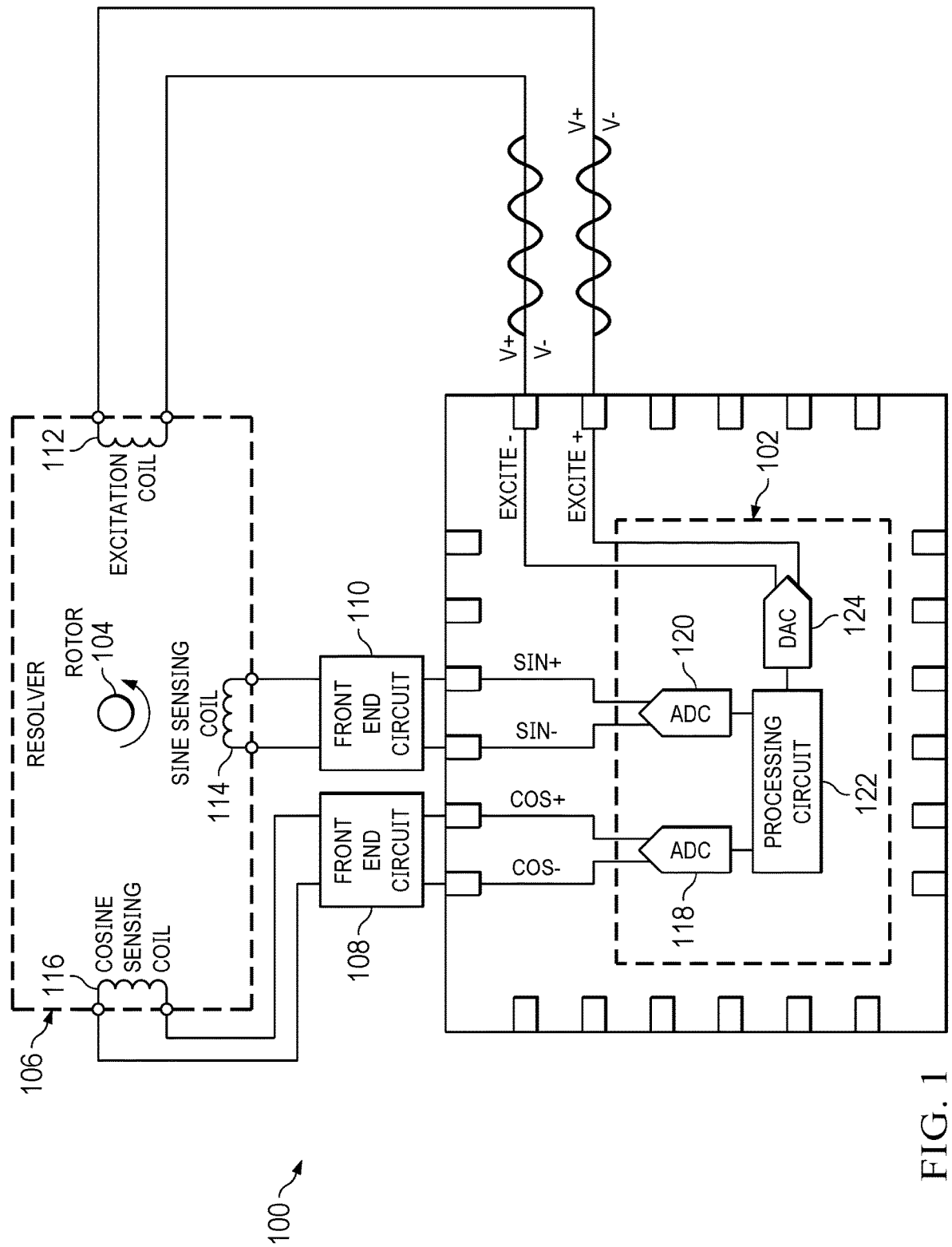
FIG. 1 is a block diagram of a resolver system, in accordance with various examples.

FIG. 1 is a block diagram of a resolver system 100, in accordance with various examples. In an example, the system 100 includes a circuit 102, a rotor 104, a resolver 106, and front end circuits 108, 110. In some examples, the resolver 106 includes a excitation coil 112, a sine sensing coil 114, and a cosine sensing coil 116. In some examples, the circuit 102 includes an analog-to-digital converter (ADC) 118, and ADC 120, a processing circuit 122, and a digital-to-analog converter (DAC) 124. In various examples, the DAC 124 may be implemented according to any suitable architecture, such as a linear DAC, a pulse-width modulation (PWM) circuit, etc. In various examples, the system 100 may be representative of, or suitable for implementation in, a transportation vehicle, a commercial vehicle, commercial machinery, industrial machinery, robots, etc.

In an example architecture of the system 100, the resolver 106 is positioned with respect to the rotor 104 to cause the excitation coil 112, the sine sensing coil 114, and the cosine sensing coil 116 to be arranged with respect to the rotor 104 as shown in FIG. 1. Each of the excitation coil 112, the sine sensing coil 114, and the cosine sensing coil 116 has first and second terminals. In some examples, the first terminal is a positive terminal and the second terminal is a negative terminal. The first and second terminals of the sine sensing coil 114 are coupled to the front end circuit 110. The first and second terminals of the cosine sensing coil 116 are coupled to the front end circuit 108. The front end circuit 108 has first and second outputs coupled to first and second cosine pins of the circuit 102, respectively. The front end circuit 110 has first and second outputs coupled to first and second sine pins of the circuit 102, respectively.

In an example, the ADC 118 has first and second inputs coupled to the first and second cosine pins, respectively, and has an output. The ADC 120 has first and second inputs coupled to the first and second sine pins, respectively, and has an output. In some examples, the ADC 118 and/or the ADC 120 may be referred to as a measurement circuit. The processing circuit 122 has a first input coupled to the output of the ADC 118, a second input coupled to the output of the ADC 120, and has an output. In some examples, the first and second inputs of the processing circuit 122, and the output of the processing circuit 122, are differential (e.g., each includes two distinct signaling lines having opposite polarities). The DAC 124 has an input coupled to the output of the processing circuit 122, and has first and second outputs coupled to the first and second terminals coupled to first and second excitation pins of the circuit 102, respectively. The first and second terminals of the excitation coil 112 are coupled to the first and second excitation pins, respectively. In some examples, other components (not shown) may be coupled between the first and second terminals of the excitation coil 112 and the first and second excitation pins.

In an example of operation of the system 100, the circuit 102, via the processing circuit 122 and DAC 124, drive the excitation coil 112 with a sinusoidal signal to excite the sine sensing coil 114 and the cosine sensing coil 116. Rotation of the rotor 104 causes a signal based on the sinusoidal signal and modulated according to the rotation to be provided on the sine sensing coil 114 and the cosine sensing coil 116. In response, the sine sensing coil 114 provides a sensed sine signal and the cosine sensing coil 116 provides a sensed cosine signal. The front end circuit 108 receives the sensed cosine signal, attenuates the sensed cosine signal to provide an attenuated cosine signal, and provides the attenuated cosine signal to the circuit 102. The front end circuit 110 receives the sensed sine signal, attenuates the sensed sine signal to provide an attenuated sine signal, and provides the attenuated sine signal to the circuit 102. The ADC 118 receives the attenuated cosine signal and provides a digital representation of the attenuated cosine signal to the processing circuit 122. The ADC 120 receives the attenuated sine signal and provides a digital representation of the attenuated sine signal to the processing circuit 122.

The processing circuit 122 processes the digital representation of the attenuated cosine signal and the digital representation of the attenuated sine signal to determine actions to perform. In some examples, the processing circuit 122 processes the digital representation of the attenuated cosine signal and the digital representation of the attenuated sine signal to determine a digital value for providing to the DAC 124 for driving the excitation coil 112. In some examples, the processing circuit 122 processes the digital representation of the attenuated cosine signal and the digital representation of the attenuated sine signal to determine a value or signal useful in controlling a motor associated with the rotor 104 or to which the rotor 104 is coupled. In other examples, the processing circuit 122 processes the digital representation of the attenuated cosine signal and the digital representation of the attenuated sine signal to determine any other suitable values or signals for use in an application that may be useful to operation of the system 100, such as to provide notifications to a user, or to provide to other components (not shown) for control.

Figure 2:
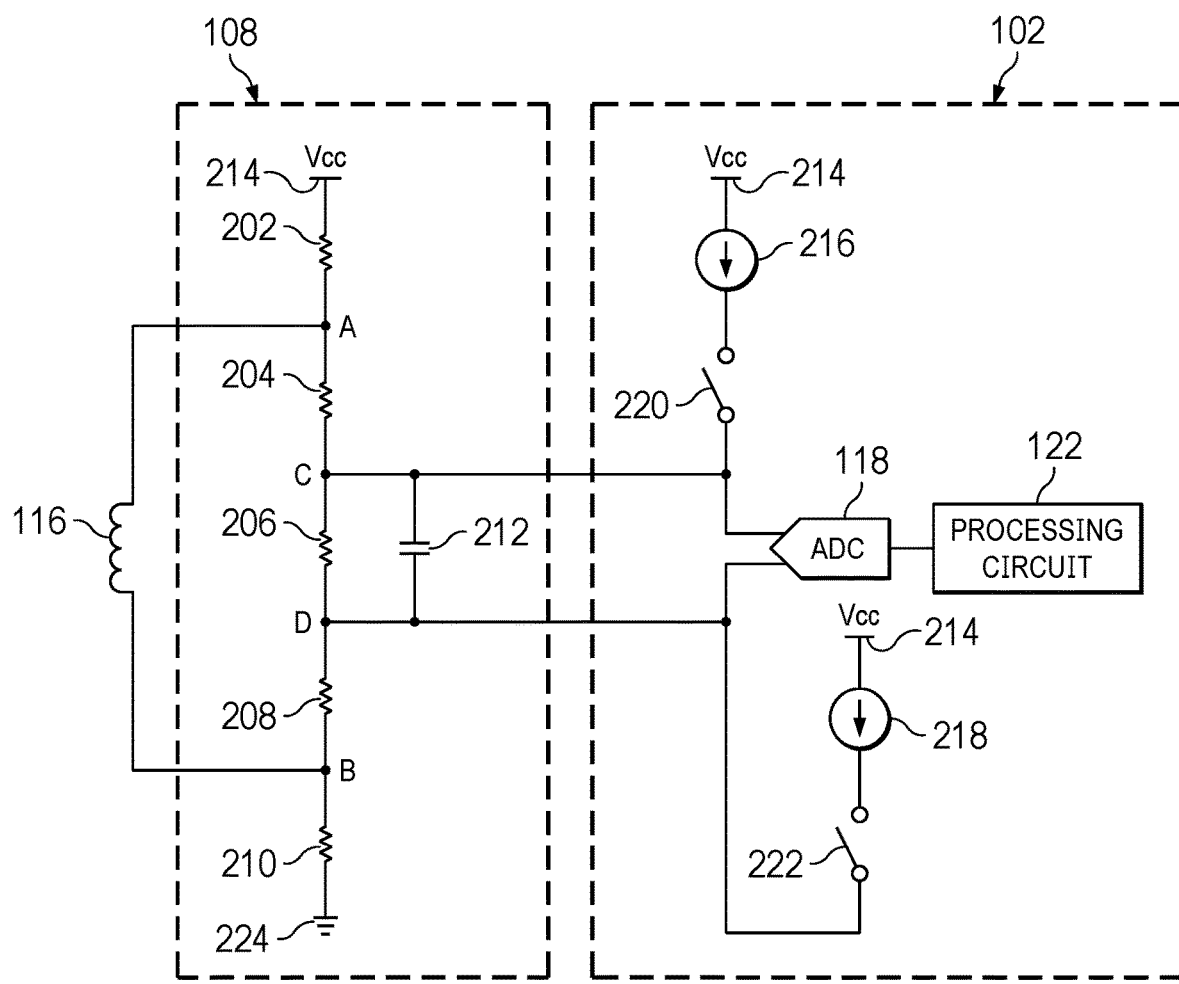
FIG. 2 is a schematic diagram of a front end circuit, in accordance with various examples.

FIG. 2 is a schematic diagram of the front end circuit 108 and circuit 102, in accordance with various examples. In an example, the front end circuit 108 of FIG. 2 is a successive approximation register (SAR) ADC-style front end. While the front end circuit 108 and cosine sensing coil 116 are discussed with respect to FIG. 2, similar principles apply to the front end circuit 110 and the sine sensing coil 114, and the schematic diagram of front end circuit 110 and the sine sensing coil 114 may be substantially the same. As such, an architecture and operation of the front end circuit 110 may be understood based on the description of architecture and operation of the front end circuit 108 included herein.

In some examples, the front end circuit 108 includes resistors 202, 204, 206, 208, 210, and a capacitor 212. In some examples, the front end circuit 108 includes a voltage source 214 and/or a terminal configured to couple to the voltage source 214. Although not shown in FIG. 1, in some examples, the circuit 102 includes current sources 216, 218, and switches 220, 222. In an example architecture of the front end circuit 108, the resistor 202 has a first terminal coupled to the voltage source 214, and a second terminal coupled to a node A, which is coupled to the first terminal of the cosine sensing coil 116. The resistor 204 has a first terminal coupled to the node A and a second terminal coupled to a node C, which is coupled to the first cosine pin of the circuit 102. The resistor 206 has a first terminal coupled to the node C and a second terminal coupled to a node D, which is coupled to the second cosine pin of the circuit 102. The resistor 208 has a first terminal coupled to the node D and a second terminal coupled to a node B, which is coupled to the second terminal of the cosine sensing coil 116. The resistor 210 has a first terminal coupled to the node B and a second terminal coupled to a ground terminal 224 at which a ground voltage potential is provided. The capacitor 212 is coupled in parallel with the resistor 206 such that the capacitor 212 has a first terminal coupled to the node C and a second terminal coupled to the node D.

The current source 216 has a first terminal coupled to the voltage source 214, and has a second terminal. The current source 218 has a first terminal coupled to the voltage source 214, and has a second terminal. The switch 220 has a first terminal coupled to the second terminal of the current source 216, and has a second terminal coupled to the first input of the ADC 118. The switch 222 has a first terminal coupled to the second terminal of the current source 218, and has a second terminal coupled to the second input of the ADC 118. In some examples, the switches 220, 222 each have control terminals coupled to any suitable device or component for controlling a switching state of the switches 220, 222. Although not shown in FIG. 2, in some examples, the control terminals are coupled to the processing circuit 122.

In an example of operation of the front end circuit 108 in combination with the circuit 102, a bias voltage is provided across the cosine sensing coil 116. For example, the cosine sensing coil 116 functions as a short circuit between the nodes A and B in the presence of a direct current (DC) bias. By applying a DC bias voltage, a common mode operating voltage of the ADC 118 is increased, enabling the processing circuit 122 to perform fault detection based on signals received from the front end circuit 108. To provide the bias voltage, the voltage source 214 provides a voltage (Vcc). Because the cosine sensing coil 116 functions as a DC short, the least path of resistance between the resistor 202 and the resistor 210 is through the cosine sensing coil 116. Therefore, the resistor 202 and the resistor 210 form a voltage divider to create the bias voltage at the nodes A and B. In examples in which a resistance of the resistor 202 is approximately equal to a resistance of the resistor 210, a value of the bias voltage is approximately equal to Vcc/2.

Responsive to receipt of the sensed cosine signal from the cosine sensing coil 116 at the nodes A and B, the resistors 204, 206, 208 form voltage dividers for providing the attenuated cosine signal. For example, the resistor 206 has a resistance approximately equal to a sum of resistances of the resistors 204 and 208. In such an example, the attenuated cosine signal may have an amplitude approximately one-half of an amplitude of the sensed cosine signal. In some examples, the resistor 204 and the capacitor 212 form a first order low pass filter at the node C. Similarly, the resistor 208 and the capacitor 212 form another first order low pass filter at the node D. The first order filters may improve performance of the front end circuit 108 by rejecting input noise (e.g., via filtering) that may be present at the nodes A or B. In some examples, the capacitor 212 may also improve performance of the ADC 118, such as by performing charge sharing with sampling capacitors (not shown) of the ADC 118.

As described above, in some examples, a topology of the front end circuit 108 facilitates fault detection by the processing circuit 122. For example, based on values of the digital representation of the attenuated cosine signal and the digital representation of the attenuated sine signal, the processing circuit 122 may determine that fault conditions related to the cosine sensing coil 116 and/or the front end circuit 108 exist. In some examples, these fault determinations may be made based on distortion characteristics or other variation in the common mode voltage (e.g., the bias voltage of Vcc/2).

In one example, the fault condition may be a short to ground at the second terminal of the cosine sensing coil 116 (e.g., at the node B). In such an example, the processing circuit 122 may determine that the common mode voltage has been pulled low to approximately equal the ground voltage potential. Responsive to determining that the common mode voltage has been pulled low to approximately equal the ground voltage potential, the processing circuit 122 determines that a short to ground fault has occurred.

In another example, the fault condition may be a short to supply at the first terminal of the cosine sensing coil 116 (e.g., at the node A). In such an example, the processing circuit 122 may determine that the common mode voltage (e.g., the bias voltage of Vcc/2) has been pulled high to approximately equal Vcc. Responsive to determining that the common mode voltage has been pulled high to approximately equal Vcc, the processing circuit 122 determines that a short to supply fault has occurred.

In another example, the fault condition may be an open circuit between the first terminal of the cosine sensing coil 116 and the front end circuit 108 (e.g., the node A). In such an example, the processing circuit 122 may determine that the common mode voltage as provided at the first cosine pin (e.g., as provided at the nodes A and C) has been pulled high to approximately equal Vcc and the common mode voltage as provided at the second cosine pin (e.g., as provided at the nodes B and D) has been pulled low to approximately equal the ground voltage potential. Responsive to determining that the common mode voltage as provided at the first cosine pin has been pulled high to approximately equal Vcc and the common mode voltage as provided at the second cosine pin has been pulled low to approximately equal the ground voltage potential, the processing circuit 122 determines that an open circuit fault has occurred.

In another example, the fault condition may be a short across the cosine sensing coil 116 (e.g., a short between nodes A and B). In such an example, the common mode voltage may remain substantially unchanged because the common mode voltage results from a DC bias and the cosine sensing coil 116 functions as a short for DC signals. However, differential signals that would otherwise be provided at the nodes A and B, and therefore attenuated at the nodes C and D will be substantially reduced. As a result, the processing circuit 122 may determine that a short across the cosine sensing coil 116 has occurred if a value of the attenuated cosine signal is approximately equal to a value of the common mode voltage and a value of a digital representation of the attenuated sine signal (e.g., as resulting from the sine sensing coil 114) is not at a peak value of its sinusoidal pattern.

While existence of the above fault conditions are determined based on the common mode voltage, some fault conditions may not be identifiable based on analyzing the common mode voltage. Such faults may include a short between two sense lines of the front end circuit 108 and/or the circuit 102, such as a short between the node C and the node D. In some such examples, the circuit 102 may bias nodes C and D to perform fault detection.

In an example, a phase difference represented in the between the digital representation of the attenuated cosine signal and the digital representation of the attenuated sine signal (e.g., as resulting from the sine sensing coil 114) may be approximately 90 degrees under normal operating conditions. Responsive to the processing circuit 122 determining that the phase different is not 90 degrees (e.g., is approximately 0 degrees), the processing circuit 122 may determine that a short between the node C and the node D has occurred.

In another example, a common mode shift introduced at the node C should have no effect on the common mode voltage at the node D, and vice versa. In some examples, by controlling the switch 220 to close (while the switch 222 remains open), a common mode shift based on a current sourced (or sunk) by the current source 216 occurs at the node C. Under normal operating conditions, the common mode shift will be reflected at the first cosine terminal, but not at the second cosine terminal. Response to detecting that the common mode shift is reflected at both the first cosine terminal and the second cosine terminal, the processing circuit 122 may determine that a short between the node C and the node D has occurred. A similar process may be performed with the current source 218 and the switch 222.

In various examples, other fault detection schemes may be implemented. For example, the processing circuit 122 may perform signal integrity checks or other analysis operations on the digital representation of the attenuated cosine signal and/or the digital representation of the attenuated sine signal, which are not limited by the architecture of the front end circuits 108, 110.

Figure 3:
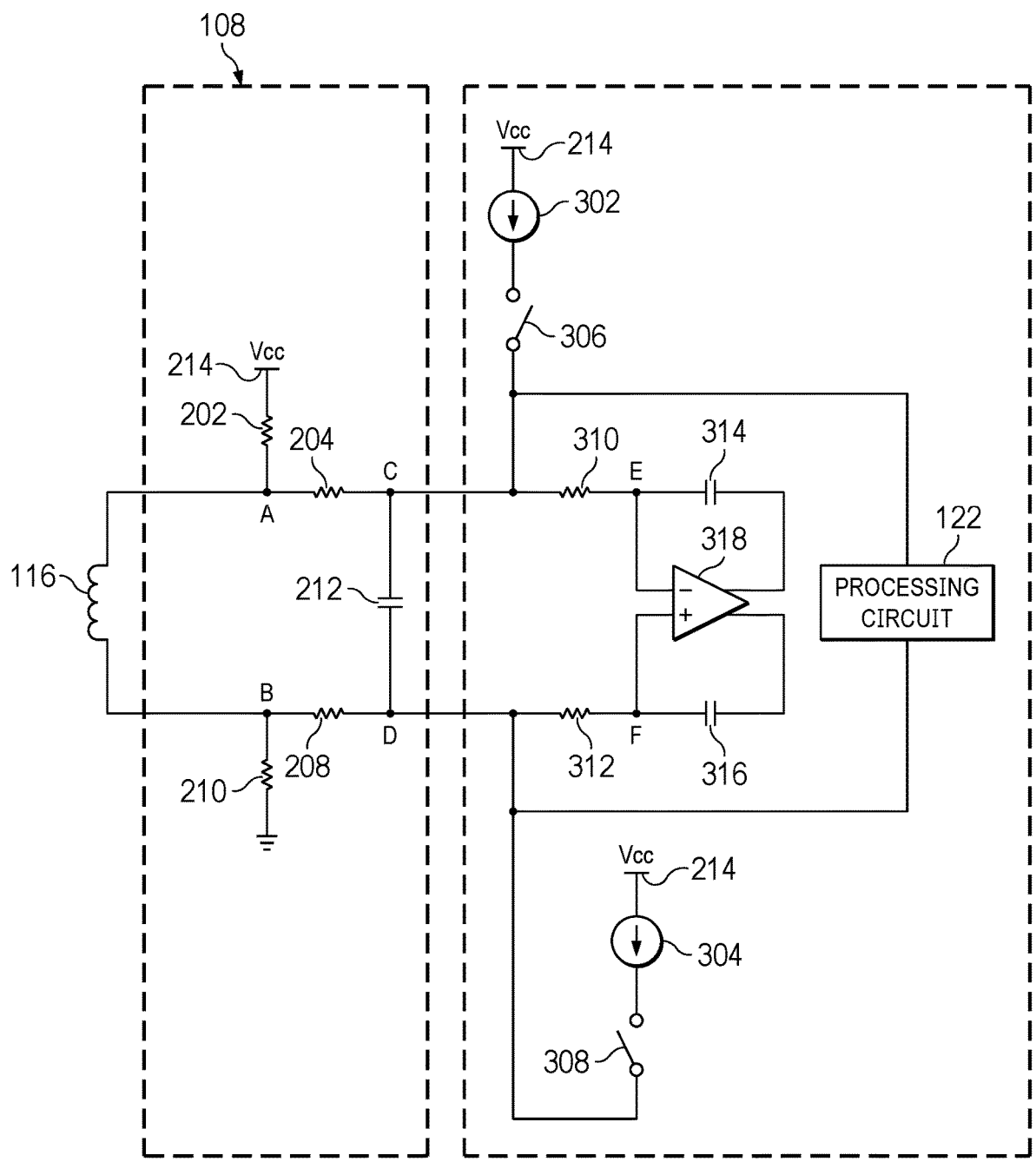
FIG. 3 is a schematic diagram of a front end circuit, in accordance with various examples.

FIG. 3 is another schematic diagram of the front end circuit 108, in accordance with various examples. In an example, the front end circuit 108 of FIG. 3 is a continuous sigma-delta ADC style front end. The front end circuit 108 of FIG. 3 may vary from the front end circuit 108 of FIG. 2 in that the front end circuit 108 of FIG. 3 may have a higher resolution, but slower settling speed, than the front end circuit 108 of FIG. 2, making the front end circuits 108 of FIG. 2 and FIG. 3 individually more or less suitable for certain application environments. While the front end circuit 108 and cosine sensing coil 116 are discussed with respect to FIG. 3, similar principles apply to the front end circuit 110 and the sine sensing coil 114, and the schematic diagram of front end circuit 110 and the sine sensing coil 114 may be substantially the same. As such, an architecture and operation of the front end circuit 110 may be understood based on the description of architecture and operation of the front end circuit 108 included herein.

The front end circuit 108 as shown in FIG. 3 may have substantially similar components and substantially a same architecture as the front end circuit 108 as shown in FIG. 2, with an exception of the front end circuit 108 of FIG. 3 omitting the resistor 206, and such description is not repeated herein with respect to FIG. 3. Although not shown in FIG. 1, in some examples, the circuit 102 includes current sources 302, 304, switches 306, 308, resistor 310, 312, capacitors 314, 316, and an amplifier 318.

The current source 302 has a first terminal coupled to the voltage source 214, and has a second terminal. The current source 304 has a first terminal coupled to the voltage source 214, and has a second terminal. The switch 306 has a first terminal coupled to the second terminal of the current source 302, and has a second terminal coupled to the node C. The switch 308 has a first terminal coupled to the second terminal of the current source 304, and has a second terminal coupled to the node D. In some examples, the switches 306, 308 each have control terminals coupled to any suitable device or component for controlling a switching state of the switches 306, 308. Although not shown in FIG. 3, in some examples, the control terminals are coupled to the processing circuit 122. The resistor 310 has a first terminal coupled to the first terminal of the capacitor 212 and a second terminal coupled to a node E, which is coupled to an inverting input of the amplifier 318. The resistor 312 has a first terminal coupled to the second terminal of the capacitor 212 and a second terminal coupled to a node F, which is coupled to a non-inverting input of the amplifier 318. The capacitor 314 is coupled between a first output of the amplifier 318 and the node E. The capacitor 316 is coupled between a second output of the amplifier 318 and the node F. In some examples, the processing circuit 122 is coupled to the node C and the node D. In other examples, other components, such as comparators (not shown), have first inputs coupled to the node C and the node D, respectively, seconds inputs that receive respective reference signals, and outputs coupled to the processing circuit 122.

In an example of operation of the front end circuit 108 in combination with the circuit 102, the amplifier 318, which may be a differential amplifier, provides a common mode bias voltage (VbiasAmp) at nodes E and F, through an internal common mode feedback circuit. Resistors 310, 312, capacitors 314, 316, and amplifier 318 together form a front end interface stage of a continuous type sigma-delta ADC. The voltage source 214 provides Vcc such that approximately Vcc/2 is provided at the nodes A and B, as described above with respect to FIG. 2 in examples in which resistances of the resistors 202 and 210 are approximately equal. Accordingly, a first common mode voltage (Vbiasmon1) provided at the node C is approximately equal to (Vcc/2-VbiasAmp)*R310/(R204+R310), where R310 is a resistance of the resistor 310 and R204 is a resistance of the resistor 204. Similarly, a second common mode voltage (Vbiasmon2) provided at the node D is approximately equal to (Vcc/2-VbiasAmp)*R312/(R208+R312), where R312 is a resistance of the resistor 312 and R208 is a resistance of the resistor 208.

Responsive to receipt of the sensed cosine signal from the cosine sensing coil 116 at the nodes A and B, the resistors 204, 310 form a first voltage divider and the resistors 208, 312 for a second voltage divider for providing the attenuated cosine signal. For example, the resistor 310 has a resistance approximately equal to a resistance of the resistor 204, and the resistor 312 has a resistance approximately equal to a resistance of the resistor 208. In such an example, the attenuated cosine signal may have an amplitude approximately one-half of an amplitude of the sensed cosine signal. In some examples, the resistor 204 and the capacitor 212 form a first order low pass filter at the node C. Similarly, the resistor 208 and the capacitor 212 form another first order low pass filter at the node D. The first order filters may improve performance of the front end circuit 108 by rejecting input noise (e.g., via filtering) that may be present at the nodes A or B.

As described above, in some examples, a topology of the front end circuit 108 facilitates fault detection by the processing circuit 122. For example, based on values of Vbiasmon1 and Vbiasmon2, the processing circuit 122 may determine that fault conditions related to the cosine sensing coil 116 and/or the front end circuit 108 exist. In some examples, these fault determinations may be made based on variation in Vbiasmon1 and/or Vbiasmon2 from a respective reference signal. In various examples, a value or values of the reference signal(s) may be determined based on an application environment in which the front end circuit 108 is implemented, the scope of which is not limited herein.

In one example, the fault condition may be a short to ground at the second terminal of the cosine sensing coil 116 (e.g., at the node B). In such an example, the processing circuit 122 may determine that Vbiasmon1 and Vbiasmon2 have been pulled low to approximately equal the ground voltage potential. Responsive to determining that Vbiasmon1 and Vbiasmon2 have been pulled low to approximately equal the ground voltage potential, the processing circuit 122 determines that a short to ground fault has occurred.

In another example, the fault condition may be a short to supply at the first terminal of the cosine sensing coil 116 (e.g., at the node A). In such an example, the processing circuit 122 may determine that Vbiasmon1 and Vbiasmon2 have been pulled high to approximately equal Vcc. Responsive to determining that Vbiasmon1 and Vbiasmon2 have been pulled high to approximately equal Vcc, the processing circuit 122 determines that a short to supply fault has occurred.

In another example, the fault condition may be an open circuit between the first terminal of the cosine sensing coil 116 and the front end circuit 108 (e.g., the node A). In such an example, the processing circuit 122 may determine that Vbiasmon1 has been pulled high to approximately equal Vcc and Vbiasmon2 has been pulled low to approximately equal the ground voltage potential. Responsive to determining that Vbiasmon1 has been pulled high to approximately equal Vcc and Vbiasmon2 has been pulled low to approximately equal the ground voltage potential, the processing circuit 122 determines that an open circuit fault has occurred.

In another example, the fault condition may be a short across the cosine sensing coil 116 (e.g., a short between nodes A and B). In such an example, Vbiasmon1 and Vbiasmon2 may remain substantially unchanged because the common mode voltage results from a DC bias and the cosine sensing coil 116 functions as a short for DC signals. However, differential signals that would otherwise be provided at the nodes A and B, and therefore attenuated at the nodes C and D will be substantially reduced. As a result, the processing circuit 122 may determine that a short across the cosine sensing coil 116 has occurred if Vbiasmon1 and Vbiasmon2 are approximately equal to each other.

While existence of the above fault conditions are determined based on the common mode voltage (e.g., Vbiasmon1 and Vbiasmon2), some fault conditions may not be identifiable based on analyzing the common mode voltage. Such faults may include a short between two sense lines of the front end circuit 108 and/or the circuit 102, such as a short between the node C and the node D. In some such examples, the circuit 102 may bias nodes C and D to perform fault detection.

In an example, a phase difference represented in between the attenuated cosine signal and an attenuated sine signal (e.g., as resulting from the sine sensing coil 114) may be approximately 90 degrees under normal operating conditions. Responsive to the processing circuit 122 determining that the phase different is not 90 degrees (e.g., is approximately 0 degrees), the processing circuit 122 may determine that a short between the node C and the node D has occurred.

In another example, a common mode shift introduced at the node C should have no effect on the common mode voltage at the node D, and vice versa. In some examples, by controlling the switch 306 to close (while the switch 308 remains open), a common mode shift based on a current sourced (or sunk) by the current source 302 occurs at the node C. Under normal operating conditions, the common mode shift will be reflected at the first cosine terminal, but not at the second cosine terminal. Response to detecting that the common mode shift is reflected at both the first cosine terminal and the second cosine terminal, the processing circuit 122 may determine that a short between the node C and the node D has occurred. A similar process may be performed with the current source 304 and the switch 308.

Figure 4:
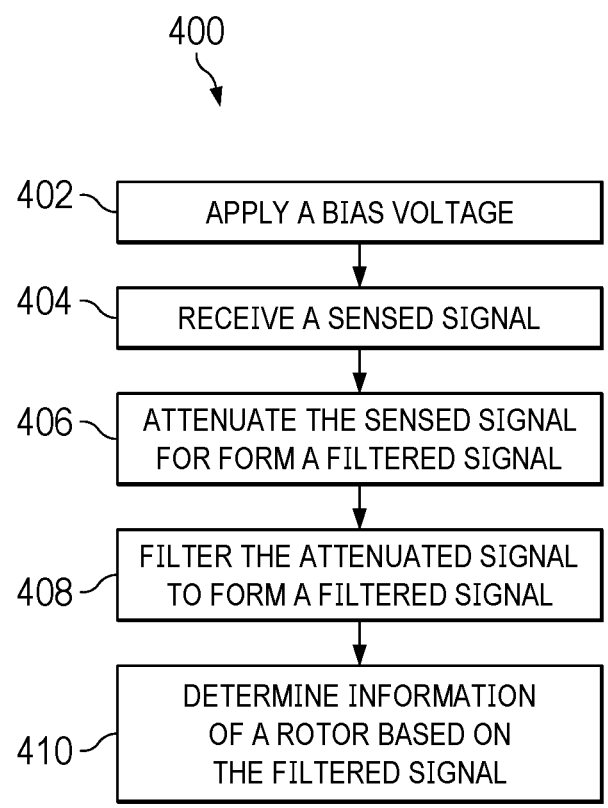
FIG. 4 is a flow diagram of a method of operation of a resolver system, in accordance with various examples.

FIG. 4 is a flow diagram of a method 400 of operation of a resolver system, in accordance with various examples. In some implementations, the resolver system is the system 100, as described above herein. As such, the method 400 may be described with reference to any one or more components or figures described above herein. In some examples, the method 400 is implemented in combination between or among multiple components of the system 100. In other examples, the method 400 is implemented by the circuit 102 and/or processing circuit 122.

At operation 402, a bias voltage is applied. In some examples, the bias voltage is determined based on a value of a voltage supply (e.g., Vcc) and resistances of a voltage divider. In some examples, the bias voltage is approximately Vcc/2.

At operation 404, a sensed signal is received. In some examples, the sensed signal is a cosine signal. In other examples, the sensed signal is a sine signal. The sensed signal may be received from a coil of a resolver, such as the resolver 106, and the sensed signal may be modulated based on rotation of a rotor or other rotary element. In some examples, the sensed signal may be a differential signal, having positive and negative (or first and second) components.

At operation 406, the sensed signal is attenuated to form an attenuated sensed signal. In some examples, the attenuation is performed by a voltage divider, formed by two or more impedance elements, such as resistors. In various examples, the attenuation is performed without the use of an amplifier. At operation 408, the attenuated sensed signal is filtered to form a filtered signal. However, in other examples, the filtering may be omitted. In examples which include the filtering, the filtering may be performed via a low pass filter, such as formed by one or more impedance elements that perform the attenuation, and a capacitor.

At operation 410, fault detection is performed based on the filtered signal (or the attenuated sensed signal in examples in which filtering is not performed). In some examples, the fault detection includes at least monitoring for a short to ground fault, a short to supply fault, an open fault, a short across the coil fault, and/or a cross-channel short fault In various examples, the fault detection is performed based on any suitable approach, such as those described above with respect to FIG. 2 and FIG. 3, the description of which is not repeated herein.

At operation 412, information of the rotor is determined based on the filtered signal. The information of the motor may be a position of the rotor, an angle of the rotor, a speed of the rotor, or the like. In some examples, the information of the rotor is determined by a processing element, such as the processing circuit 122, processing information based on the filtered signal from a cosine sensing coil and a similarly determined filtered signal from a sine sensing coil of the resolver. In various examples, based on the determined angle, the processing circuit performs further actions, such as providing a control signal to modify a speed of the rotor, modify an angle of the motor, modify an excitation signal provided to the resolver, or the like, the scope of which is not limited herein.

In some examples, the filtered signal is formed via a first order filter. For example, the first order filter may be a low-pass resistor-capacitor (RC) filter formed between the resistors 204, 208, respectively, and the capacitor 212, as described above. In some examples, subsequent filtering of the filtered signal may be performed, such as by a higher order filter (e.g., a bandpass filter), or any other suitable filter or filters of any suitable order. Fault detection may be performed on these subsequently filtered signals according to any suitable process, including at least the fault detection techniques described above herein.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. An apparatus, comprising:
   a sensing coil having first and second terminals;
   a first resistor having first and second terminals, the first terminal of the first resistor coupled to a voltage supply terminal, and the second terminal of the first resistor coupled to the first terminal of the sensing coil;
   a second resistor having first and second terminals, the first terminal of the first resistor coupled to the second terminal of the first resistor;
   a fourth resistor having first and second terminals, the second terminal of the fourth resistor coupled to the second terminal of the sensing coil;
   a fifth resistor having first and second terminals, the first terminal of the fifth resistor coupled to the second terminal of the fourth resistor, and the second terminal of the fifth resistor coupled to a ground terminal; and
   a measurement circuit having first and second inputs, the first input of the measurement circuit coupled to the second terminal of the second resistor, and the second input of the measurement circuit coupled to the first terminal of the fourth resistor.

2. The apparatus of claim 1, wherein the measurement circuit is an analog-to-digital converter.

3. The apparatus of claim 1, wherein the measurement circuit is a comparator.

4. The apparatus of claim 1, further comprising a capacitor having first and second terminals, the first terminal of the capacitor coupled to the second terminal of the second resistor, and the second terminal of the capacitor coupled to the first terminal of the fourth resistor.

5. The apparatus of claim 1, further comprising:
   a current source having first and second terminals, the first terminal of the current source coupled to the voltage supply terminal; and
   a switch having first and second terminals, the first terminal of the switch coupled to the second terminal of the current source, and the second terminal of the switch coupled to the second terminal of the second resistor.

6. The apparatus of claim 1, further comprising:
   a current source having first and second terminals, the first terminal of the current source coupled to the voltage supply terminal; and
   a switch having first and second terminals, the first terminal of the switch coupled to the second terminal of the current source, and the second terminal of the switch coupled to the first terminal of the fourth resistor.

7. The apparatus of claim 1, wherein:
   the sensing coil is a sensing coil of a resolver; and
   the sensing coil is configured to produce an alternating current voltage across the first and second terminals of the sensing coil.

8. The apparatus of claim 7, further comprising a third resistor having first and second terminals, the first terminal of the third resistor coupled to the second terminal of the second resistor, the second terminal of the third resistor coupled to the first terminal of the fourth resistor.

9. The apparatus of claim 8, wherein the second, third, and fourth resistors attenuate the alternating current voltage at a ratio of a resistance of the third resistor divided by a sum of the resistances of the second and fourth resistors to form an attenuated signal, and wherein the measurement circuit processes the attenuated signal to determine an angular position.

10. An apparatus, comprising:
    a processing circuit, configured to:
      receive differential signal between a first signal and a second signal; and
      perform fault detection based on a value of the differential signal, which includes:
        determining that a short to ground fault has occurred responsive to a common mode voltage of the differential signal equaling a ground voltage potential;
        determining that a short to supply fault has occurred responsive to the common mode voltage of the differential signal equaling a supply voltage;
        determining that an open fault has occurred responsive to a common mode voltage of the first signal equaling the supply voltage and a common mode voltage of the second signal equaling the ground voltage potential; and
        determining that a short across a coil fault has occurred responsive to the first signal equaling the second signal.

11. The apparatus of claim 10,
    wherein the apparatus is configured to introduce a bias to one of the first signal or the second signal; and
    wherein the processing circuit is configured to determine a cross-channel fault has occurred responsive to detecting presence of the bias in the other of the first signal or the second signal to which the bias was not applied.

12. The apparatus of claim 10, wherein the apparatus includes a front end circuit configured to:
   apply a direct-current bias to a sensing coil to form the common mode voltage;
   receive a sensed differential signal from the sensing coil; and
   attenuate the sensed signal to generate the differential signal.

13. The apparatus of claim 12, wherein the front end circuit is configured to filter the differential signal prior to providing the differential signal to the processing circuit.

14. The apparatus of claim 12, wherein the front end circuit is configured to attenuate the sensed signal via a voltage divider formed of two or more impedance elements.

15. A method, comprising:
   applying a bias voltage to a resolver system;
   receiving a sensed signal, the sensed signal varying in value based on a position of a rotary element;
   attenuating the sensed signal to generate an attenuated signal;
   detecting one or more faults in the resolver system based on the attenuated signal; and
   determining the position of the rotary element based on the attenuated signal.

16. The method of claim 15, wherein receiving the sensed signal includes receiving the sensed signal from a sine sensing coil or a cosine sensing coil of the resolver system, the sine sensing coil and the cosine sensing coil positioned proximate to the rotary element.

17. The method of claim 15, wherein attenuating the sensed signal includes processing the sensed signal with a voltage divider to generate the attenuated signal.

18. The method of claim 15, wherein the one or more faults include one or more of a short to ground fault, a short to supply fault, an open fault, a short across a coil fault, or a cross-channel short fault.

19. The method of claim 18, wherein detecting one of more of the short to ground fault, the short to supply fault, the open fault, or the short across the coil fault includes monitoring a common mode voltage of the attenuated signal.

20. The method of claim 18, wherein the attenuated signal represents a differential signal between a first signal and a second signal, and wherein detecting the cross-channel short fault includes applying a bias to one the first or the second signal of the attenuated signal.

21. The method of claim 20, wherein detecting the cross-channel short fault includes comparing a biased component of the attenuated signal to an unbiased component of the attenuated signal.

* * * * *